United States Patent
Görmer et al.

(10) Patent No.: US 12,165,277 B2
(45) Date of Patent: Dec. 10, 2024

(54) METHOD FOR CAPTURING AND PROCESSING A DIGITAL PANORAMIC IMAGE

(71) Applicant: Continental Automotive GmbH, Hannover (DE)

(72) Inventors: Steffen Görmer, Winterrieden (DE); Aless Lasaruk, Lindau (DE); Sumukha Manjunatha, Bengaluru (IN)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 17/457,140

(22) Filed: Dec. 1, 2021

(65) Prior Publication Data
US 2022/0172318 A1   Jun. 2, 2022

(30) Foreign Application Priority Data
Dec. 1, 2020 (EP) .................................. 20210996

(51) Int. Cl.
*G06T 3/08* (2024.01)
*H04N 23/69* (2023.01)
*H04N 23/698* (2023.01)

(52) U.S. Cl.
CPC ............... *G06T 3/08* (2024.01); *H04N 23/69* (2023.01); *H04N 23/698* (2023.01)

(58) Field of Classification Search
CPC ... G06T 3/005; G06T 2200/32; G06T 3/4038; G06T 5/006; H04N 5/23238;
(Continued)

(56) References Cited

U.S. PATENT DOCUMENTS 6,844,990 B2   1/2005   Artonne et al.
6,876,387 B1*  4/2005   Lee .................. H04N 5/232
                                                  348/E5.042
(Continued)

FOREIGN PATENT DOCUMENTS

CN      1703725 A    11/2005
CN    111954893 A    11/2020
(Continued)

OTHER PUBLICATIONS

Zoom ratio calculator.*
(Continued)

*Primary Examiner* — Shadan E Haghani

(57) ABSTRACT

A method for capturing and processing a digital panoramic image is disclosed. The method involves projecting a panorama onto an image sensor with a panoramic objective lens to obtain a raw image. Then, a set of N output images is created based on the raw image, where N is greater than or equal to two and each output image represents a gnomonic projection of the panorama with a given focal length. The output images have a common predetermined resolution, the focal length of the first output image has a predetermined focal length value, and the focal length of each other output image is shorter than that of the previous output image. A digital panoramic camera system comprising a panoramic objective lens, an image sensor and image processing electronics are also disclosed. The image processing electronics are adapted to perform the method according to the above description.

23 Claims, 3 Drawing Sheets

(58) Field of Classification Search
CPC ........... H04N 5/23296; H04N 5/23229; H04N 5/22541; H04N 5/232127; H04N 5/23218; H04N 5/23232; H04N 5/2253; H04N 5/2254; H04N 5/23212; G03B 37/00

See application file for complete search history.

(56) References Cited

U.S. PATENT DOCUMENTS

| | | | |
|---|---|---|---|
| 8,988,468 B2 * | 3/2015 | Cheung | G06Q 30/0276 345/581 |
| 2004/0046888 A1 * | 3/2004 | Jan | H04N 7/183 348/E7.087 |
| 2006/0062487 A1 | 3/2006 | Ouchi | |
| 2020/0068138 A1 * | 2/2020 | Gandhi | H04N 5/2628 |
| 2021/0218898 A1 * | 7/2021 | Moon | H04N 5/23229 |
| 2022/0051366 A1 | 1/2022 | Roulet et al. | |
| 2022/0385809 A1 * | 12/2022 | Kai | H04N 23/61 |

FOREIGN PATENT DOCUMENTS

| | | | | |
|---|---|---|---|---|
| EP | 3547682 A1 * | 10/2019 | | G06T 5/006 |
| JP | 3613692 B2 * | 1/2005 | | |
| JP | 2006202184 A * | 8/2006 | | |
| JP | 2007189368 A * | 7/2007 | | |
| JP | 2015060162 A | 3/2015 | | |
| JP | 2019211943 A * | 12/2019 | | |
| WO | WO-2006031214 A1 * | 3/2006 | ........... | G06T 3/0006 |

OTHER PUBLICATIONS

European Search Report mailed on Apr. 29, 2021 for the counterpart European Application No. 20210996.3.

European Extended Search Report mailed on Jul. 13, 2021 for the counterpart European Application No. 20210996.3.

Pranali Dhane et al.. "A generic non-linear method for fisheye correction", International Journal of Computer Applications 51, No. 10 (2012), pp. 58-65.

Korean Office Action dated May 15, 2023 for the counterpart Korean Patent Application No. 10-2021-0160492 and Global Dossier Translation of same.

Chinese Office Action dated Oct. 23, 2023 for the counterpart Chinese Patent Application No. 202111472652.1 and DeepL translation of same.

* cited by examiner

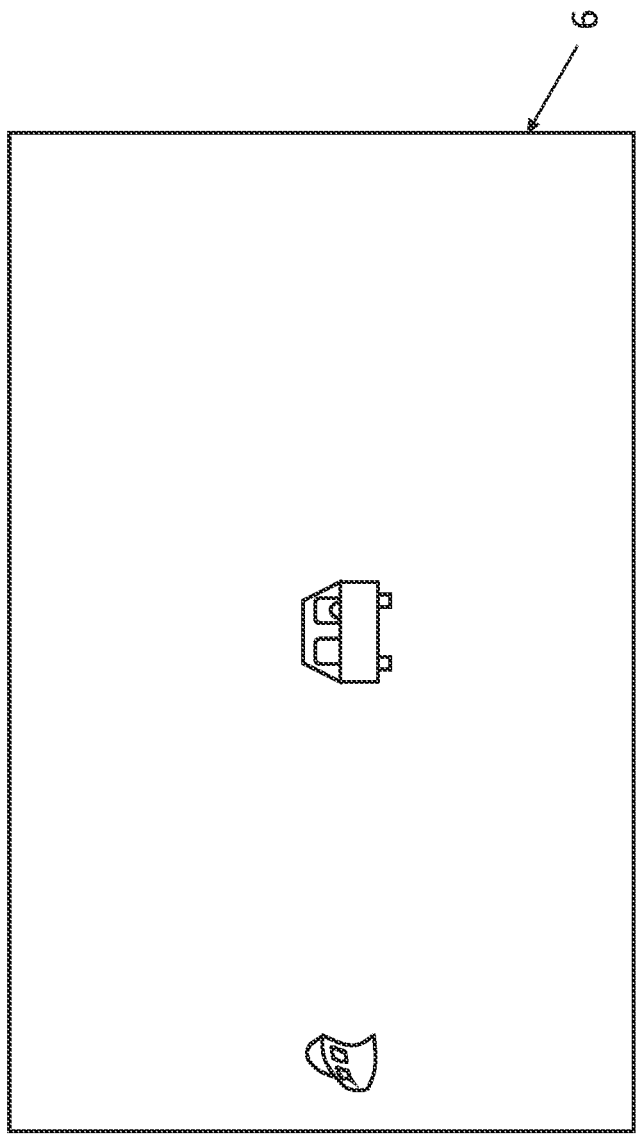

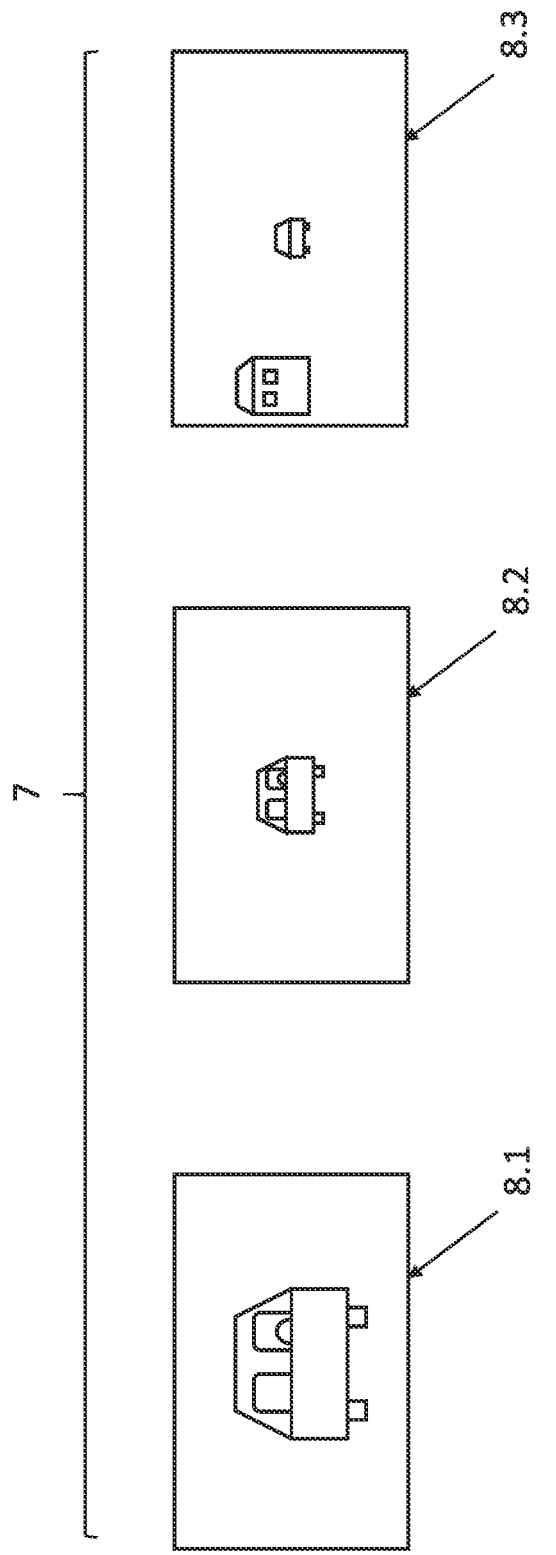

METHOD FOR CAPTURING AND PROCESSING A DIGITAL PANORAMIC IMAGE

TECHNICAL FIELD

The technical field relates to a method for capturing and processing a digital panoramic image and a digital panoramic camera system.

BACKGROUND

Digital panoramic images have a wide range of applications and may be taken by digital panoramic camera systems such as, e.g., cameras in vehicles or surveillance cameras.

A method for capturing and displaying a variable resolution digital panoramic image is, e.g., disclosed in the United States patent application US 2004/0136092 A1. In said method, a panorama is projected onto an image sensor by means of a panoramic objective lens. The panoramic objective lens has an image point distribution function that is not linear relative to the field angle of object points of the panorama. In particular, the distribution function has a maximum divergence of at least ±10% compared to a linear distribution function, such that the panoramic image obtained has at least one substantially expanded zone and at least one substantially compressed zone. That way, the objective lens expands the most useful zones of the image, which depend on the intended application. The definition is excellent in said useful zones but mediocre in the zones of lesser importance.

However, this method produces a distorted image and, in particular, straight lines in the panorama do not appear straight in the image. Straight lines remaining straight is, however, an important feature for subsequent image analysis, e.g., for object recognition based on artificial intelligence.

SUMMARY

It is an object of the present disclosure to provide a method for capturing and processing a digital panoramic image wherein straight lines in the panorama are straight in the image and the definition is excellent in some zones of the image.

The problem is solved by the subject-matter presented herein. Embodiments are provided by the following description and the accompanying figures.

According to a first aspect, a method for capturing and processing a digital panoramic image is provided. In a first step of the method, a panorama is projected onto an image sensor by means of a panoramic objective lens to obtain a raw image. Said panorama may be any kind of scene that is of interest for the particular application. For instance, for cameras in vehicles, the panorama may be the view out of the windshield or out of the rear window. The panoramic objective lens may be any kind of wide angle objective lens, such as a fisheye lens or a wide-angle rectilinear lens. The panoramic objective lens projects the panorama onto the image sensor, wherein the image sensor may be any kind of suitable digital image sensor, e.g., a CCD sensor or a CMOS sensor.

In a second step of the method, a set of N output images is created, based on the raw image obtained in the first step. The number N is a natural number greater than or equal to two, i.e., at least two output images are created based on the raw image. Each of said output images represents a gnomonic projection of the panorama with a given focal length. A gnomonic projection is the projection obtained by a pinhole camera, i.e., a projection with an f·tan(θ) mapping function. Hence, straight lines in the panorama will be straight lines in the output images. The focal length of the gnomonic projection is defined as the distance between the pinhole and the image plane.

The output images have a common predetermined resolution, i.e., they represent the projection of the panorama onto an image sensor with the predetermined resolution. Said resolution is, e.g., a predetermined number of pixels per length.

The output images are created such that the focal length of the first output image has a predetermined focal length value and the focal length of each other output image is shorter than that of the previous output image. That is, the focal length of the second output image is shorter than that of the first output image, the focal length of the third output image is shorter than that of the second output image, and so on.

Hence, the first output image has the highest resolution of details in the panorama, i.e., the definition is excellent in the zones covered by the first output image. The subsequent images of the set of N output images have increasingly lower resolution of details in the panorama and the Nth output image has the lowest resolution of details in the panorama.

According to an embodiment, the number N is between 3 and 7, in particular 4 or 5. Said numbers are a good match to the physical resolving power of many panoramic objective lenses.

According to an embodiment, the predetermined resolution is essentially equal to the resolution of the raw image. This provides a good confirmability of the output images compared to the raw image and eases conversions in the creation of the output images.

According to an embodiment, the predetermined focal length value is essentially equal to the focal length of the panoramic objective lens at the optical axis of the panoramic objective lens. Together with the predetermined resolution being essentially equal to the resolution of the raw image, this provides that the first output image covers all the details provided by the raw image in the region of the optical axis of the panoramic objective lens. On the other hand, no superfluous information is recorded in the first output image in the region of the optical axis of the panoramic objective lens. Since panoramic objective lenses usually have their highest resolving power in the region of the optical axis, this provides that the first output image covers all the details provided by the projection of the panorama onto the image sensor by means of the panoramic objective lens. Resolving power, in this sense, refers to resolution in a gnomonic projection. Hence, e.g., a fisheye lens with an f·θ mapping function has by construction the highest resolving power in the region of the optical axis. If an extraordinary panoramic objective lens were to be used that has the highest resolving power in a region away from its optical axis, the focal length of the first output image could be adapted such that the first output image covers all the details provided by the raw image in said region away from the optical axis with the highest resolving power.

According to an embodiment, the focal length of each output image other than the first output image is one half of the focal length of the previous output image. This enables an easy matching of image points between two output images of the same set of output images.

According to an embodiment, the focal length and dimensions of each output image other than the first output image are such that the pixel density in an outer area of the output image is approximately equal to the average pixel density in the region of the raw image that corresponds to the outer area of the output image. Dimensions of the output image are understood as the height and width of the output image, measured in pixels. Said choice of focal length and dimensions is particularly reasonable when the resolving power of the panoramic objective lens decreases with increasing distance from the optical axis, such as, e.g., for the fisheye lens with the f·θ mapping function. Then, the choice of focal length and dimensions ensures that there is only little loss of information, i.e. of details captured by the image sensor, when the output images are created. On the other hand, there is only little superfluous information recorded in the output images. Superfluous information refers to, e.g., pixels that are obtained from interpolation but do not actually comprise additional details.

The loss of information and the recording of superfluous information are, of course, counteractive. That is, if, e.g., for a given focal length, larger dimensions of the output image are chosen, there is less loss of information but more recording of superfluous information, and vice versa. Such balancing between loss of information and recording of superfluous information can be controlled by the choice of the outer area: if the outer area is very close to the area corresponding to the previous output image, there will be little loss of information and if, on the other hand, the outer area is very close to the corners of the output image, there will be little recording of superfluous information.

According to an embodiment, the output images have the same dimension, in particular the same dimension as the raw image. This choice eases the management of the output images.

According to an embodiment, creating the output images, except for the first output image, comprises downsampling the previous output image by a factor of the focal length of the previous output image divided by the focal length of the current output image and assigning the downsampled result to the corresponding area of the current output image. Hence, the usually computationally intensive conversion of the raw image to a gnomonic projection has to be performed only once per area of the raw image. As an example, the first output image is created first. For the first output image, there is no previous output image that could be downsampled, hence the conversion of the raw image to the gnomonic projection has to be performed for the full first output image. For the second output image, the first output image is downsampled, which is computationally fast, and the downsampled result is assigned to the corresponding area of the second output image. Only for the remaining area, which does not correspond to the area of the first output image, the computationally intensive conversion of the raw image has to a gnomonic projection has to be performed.

According to an embodiment, creating the output images comprises, at least for those areas to which no downsampled results have been assigned, a step of computing unnormalized coordinates corresponding to coordinates of the output image. In particular, the unnormalized coordinates account for the location of the principal point with respect to the origin of the output image. Such computation of the unnormalized coordinates may be performed, e.g., with the inverse of a pinhole camera matrix. The creation of the output images further comprises a step of computing the projection of the unnormalized coordinates onto the raw image via a lens function. That is, the location in the raw image that corresponds to the unnormalized coordinates is determined. Finally, to create the output image, color values are obtained for the pixel at the coordinates of the output image from the pixels at the projected unnormalized coordinates of the raw image. In the case of a grayscale image, the color values are just the luminance values. Said creation of the output images avoids the use of an inverse of the lens function and is therefore computationally fast.

According to an embodiment, the lens function is determined from raw images of a predetermined chart taken by the actual lens. Said determination of the lens function involves matching of points of the predetermined chart to pixels of the raw image that correspond to the points of the predetermined chart. In one example, the lens function is determined by fitting a few parameters of a given lens function model. By determining the lens function from raw images taken by the actual lens, both sample-to-sample variations in the panoramic objective lenses and variations in the mounting of the panoramic objective lenses are accounted for.

According to an embodiment, the set of output images is saved to a nonvolatile memory. Hence, the output images may be inspected and/or analyzed at a later point in time.

According to an embodiment, one of the output images out of the set of output images is displayed on a display and the output image to be displayed is chosen based on a zoom level selected by a user. In particular, the user may zoom discretely to one output image out of the set of output images. Since all the output images have already been created, zooming to one particular output image does not involve any additional computational effort.

According to an embodiment, the set of output images is accessed by an object recognition unit. Since in many cases, the object recognition units rely on straight lines in the panorama being straight in the image, the gnomonic projection underlying the output images is ideal for those object recognition units. In particular, the object recognition unit starts object recognition on the last output image out of the set of output images, i.e., on the output image with the largest field of view. If the object recognition unit detects an object of potential interest, it looks for a higher resolution image of said object in the former output images. Also, when the object recognition unit has finished analyzing the last output image, it analyzes the previous output images that show more details, albeit with a smaller field of view.

According to another aspect, a digital panoramic camera system is provided, comprising a panoramic objective lens, an image sensor and image processing electronics. The panoramic objective lens may be any kind of wide angle objective lens, such as a fisheye lens or a wide-angle rectilinear lens. The panoramic objective lens projects a panorama onto the image sensor, wherein the image sensor may be any kind of suitable digital image sensor, e.g., a CCD sensor or a CMOS sensor. The image processing electronics are adapted to perform the method according to the above description. In particular, a raw image is processed to obtain a set of N output images, wherein each output image represents a gnomonic projection of the panorama, i.e., straight lines in the panorama are straight in the output images. Further, the first output image out of the set of output images has a high resolution of details in the panorama, i.e., the definition is excellent in the zones covered by the first output image.

According to yet another aspect, a vehicle is provided comprising a digital panoramic camera system according to the above description.

These and other aspects will become apparent from and elucidated with reference to the embodiments described hereinafter.

BRIEF DESCRIPTION OF DRAWINGS

Exemplary embodiments of will be described in the following with reference to the following drawings:

FIG. 2 shows a raw image and

FIGS. 3a-3c show a set of output images.

The figures are merely schematic representations and serve only to illustrate embodiments. Identical or equivalent elements are in principle provided with the same reference signs.

DESCRIPTION OF EMBODIMENTS

Figure 1:
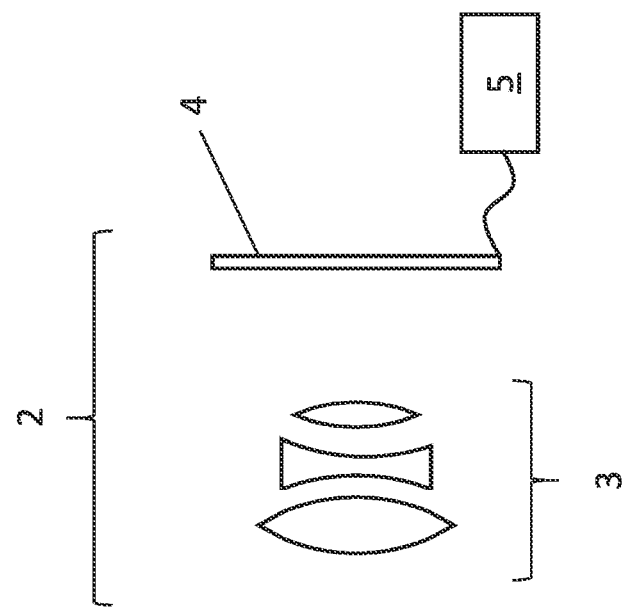
FIG. 1 shows a panorama and a digital panoramic camera system.
Figure 1:
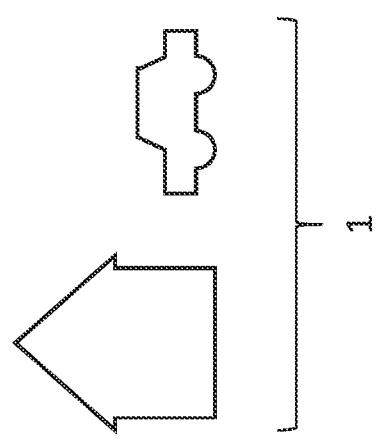

FIG. 1 shows a panorama 1, which is depicted as a house and a car, but may in principle be any kind of panorama 1 of interest. FIG. 1 further shows a digital panoramic camera system 2, comprising a panoramic objective lens 3, and image sensor 4 and image processing electronics 5.

The panoramic objective lens 3 may be any kind of wide angle objective lens, such as a fisheye lens or a wide-angle rectilinear lens. The image sensor 4 may be any kind of suitable digital image sensor, e.g., a CCD sensor or a CMOS sensor. The panoramic objective lens 3 and the image sensor 4 are arranged such that the panorama 1 is projected by the panoramic objective lens 3 onto the image sensor 4. Said image sensor 4 is connected to the image processing electronics 5, wherein the image processing electronics 5 may, e.g., be an on-board chip of the panoramic camera system 2 or a separate processor.

FIG. 2 shows a raw image 6 of the panorama 1, as directly obtained from the image sensor 4 of the panoramic camera system 2. Objects at the center of the raw image 6, here the car, show lots of detail and almost no distortion. Objects towards outer areas of the raw image 6, here the house, however, show little detail and a lot of distortion. Said distortion is particularly disadvantageous for automatic object recognition which relies in many cases on straight lines in the nature being straight on the image.

FIGS. 3a-3c show a set 7 of three output images 8 created by the image processing electronics 5 based on the raw image 6.

FIG. 3a shows the first output image 8.1 which has a resolution equal to the resolution of the raw image 6 and a focal length (corresponding to a pinhole camera) equal to the focal length of the panoramic objective lens 3. Hence, the first output image 8.1 shows the same amount of detail as the raw image 6. However, due to the first output image 8.1 being a gnomonic projection of the panorama 1, outer areas of the raw image 6 are not covered by the first output image 8.1.

The first output image 8.1 has been created based on the raw image 6 by computing unnormalized coordinates corresponding to the coordinates of each pixel of the first output image 8.1. Then, using a lens function corresponding to the panoramic objective lens 3, said unnormalized coordinates have been projected onto the raw image 6 and the color values for the pixel at the coordinates of the first output image 8.1 has been obtained from the pixels at the projected unnormalized coordinates of the raw image 6.

FIG. 3b shows the second output image 8.2 which has a resolution equal to the resolutions of the raw image 6 and the first output image 8.1 and a focal length equal to one half of the focal length of the first output image 8.1. In creating the second output image 8.2, the first output image 8.1 is sampled down by a factor of two and said downsampled first output image 8.1 is assigned to the central area of the second output image 8.2. The outer areas of the second output image 8.2 are then created similarly to the method described for the creation of the first output image 8.1

FIG. 3c shows the third output image 8.3 which has a resolution equal to the resolutions of the raw image 6, first output image 8.1 and second output image 8.2 and a focal length equal to one half of the focal length of the second output image 8.2. The creation of the third output image 8.3 is similar to the creation of the second output image 8.2, as described above. The third output image 8.3 shows details from the edges of the raw image 6, here the house. Those details are undistorted and hence accessible to object recognition units that rely on straight lines being straight.

The set 7 of output images 8 covers the field of view given by the raw image 6, provides a gnomonic projection of the panorama 1, has an excellent definition (corresponding to the definition of the panoramic camera system 2) in the central region and takes up only a reasonable amount of memory.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A method for capturing and processing a digital panoramic image, the method comprising:
    projecting a panorama onto an image sensor with a panoramic objective lens to obtain a raw image; and
    creating, by image processing electronics, a set of N output images based on the raw image, wherein
        N is greater than or equal to two,
        each output image represents a gnomonic projection of the panorama with a given focal length,
        the output images have a common predetermined resolution,
        the focal length of a first output image has a predetermined focal length value, and
        the focal length of each other output image is shorter than that of a previous output image, wherein
    creating the output images, except for the first output image, comprises
        downsampling the previous output image by a factor of the focal length of the previous output image divided by the focal length of a current output image, and
        assigning a downsampled result to a corresponding area of the current output image,
    wherein in creating the set of N output images, each area of a plurality of areas of the raw image is converted to the gnomonic projection representation of the panorama only one time, with a first area of the plurality of areas being converted when creating the first output image, and a second area of the plurality of areas being converted when creating a second output image.

2. Method according to claim 1, wherein the number N is between 3 and 7.

3. Method according to claim 1, wherein the predetermined resolution is equal to the resolution of the raw image.

4. Method according to claim 1, wherein the predetermined focal length value is essentially equal to the focal length of the panoramic objective lens—at the optical axis of the panoramic objective lens.

5. Method according to claim 1, wherein the focal length of each output image other than the first output image is one half of the focal length of the previous output image.

6. Method according to claim 1, wherein the focal length and dimensions of each output image other than the first output image are such that a pixel density in an outer area of the output image is equal to an average pixel density in a region of the raw image that corresponds to the outer area of the output image.

7. Method according to claim 1, wherein the output images have the same dimensions as dimensions of the raw image, the dimensions comprising image height and width.

8. Method according to claim 1, wherein creating the output images comprises, for areas to which no downsampled results have been assigned,
computing unnormalized coordinates corresponding to coordinates of the current output image,
computing the projection of the unnormalized coordinates onto the raw image via a lens function, and
obtaining color values for pixels of the current output image at coordinates of the output image from the pixels at the projected unnormalized coordinates of the raw image.

9. Method according to claim 8, wherein the lens function is determined from raw images of a predetermined chart taken by the panoramic objective lens.

10. Method according to claim 1, wherein the set of output images is saved to a nonvolatile memory.

11. Method according to claim 1, wherein one of the output images out of the set of output images is displayed on a display and the output image to be displayed is chosen based on a zoom level selected by a user.

12. Method according to claim 1, wherein each output image of the set of output images is accessed by an object recognition unit, and the object recognition unit starts object recognition on the last output image out of the set of output images.

13. The method according to claim 12, wherein responsive to a detection of an object of potential interest in the last output image of the set of output images, the object recognition unit looks for the detected object in other of the output images in the set of output images.

14. The method according to claim 1, wherein creating the set of N output images comprises, for remaining areas to which no downsampled results have been assigned, converting each remaining area of the raw image to a gnomonic projection representation of the panorama such that the converted remaining areas and the downsampled results form the output images other than the first output image.

15. A digital panoramic camera system, comprising:
a panoramic objective lens,
an image sensor; and
image processing electronics, wherein
the image processing electronics are adapted to
project a panorama onto the image sensor with the panoramic objective lens to obtain a raw image, and
create a set of N output images based on the raw image, wherein
N is greater than or equal to two,
each output image represents a gnomonic projection of the panorama with a given focal length,
the output images have a common predetermined resolution, the common predetermined resolution being a predetermined number of pixels per unit length,
the focal length of a first output image has a predetermined focal length value, and
the focal length of each other output image is shorter than that of the previous output image from the set of output images,
wherein creating the output images, except for the first output image, comprises
downsampling the previous output image by a factor of the focal length of the previous output image divided by the focal length of a current output image, and
assigning a downsampled result to a corresponding area of the current output image,
wherein creating the output images comprises, for remaining areas to which no downsampled results have been assigned, converting each remaining area of the raw image to a gnomonic projection representation of the panorama such that the converted remaining areas and the downsampled results form the output images other than the first output image.

16. The digital panoramic camera system of claim 15, wherein each output image of the set of output images is accessed by an object recognition unit, and the object recognition unit starts object recognition on the last output image out of the set of output images and, responsive to the object recognition unit detecting an object of potential interest in the last output image, the object recognition unit looks for the detected object in other of the output images in the set of output images.

17. The digital panoramic camera system of claim 15 according to claim 1, wherein the predetermined resolution is equal to the resolution of the raw image.

18. The digital panoramic camera system according to claim 15, wherein creating the output images comprises, for areas to which no downsampled results have been assigned,
computing unnormalized coordinates corresponding to coordinates of the output image,
computing a projection of the unnormalized coordinates onto the raw image via a lens function, and
obtaining color values for the pixels of the output image at the coordinates of the output image from the pixels at the projected unnormalized coordinates of the raw image.

19. The digital panoramic camera system according to claim 15, wherein the number N is between 3 and 7.

20. The digital panoramic camera system according to claim 15, wherein in creating the set of N output images, each area of a plurality of areas of the raw image is converted to the gnomonic projection representation of the panorama only one time, with a first area of the plurality of areas being converted when creating the first output image, and a second area of the plurality of areas being converted when creating a second output image.

21. Vehicle comprising a digital panoramic camera system including:
a panoramic objective lens,
an image sensor; and
image processing electronics, wherein
the image processing electronics are adapted to
project a panorama onto the image sensor with the panoramic objective lens to obtain a raw image, and create a set of N output images based on the raw image, wherein
  N is greater than or equal to two,
  each output image represents a gnomonic projection of the panorama with a given focal length,
  the output images have a common predetermined resolution, the common predetermined resolution being a predetermined number of pixels per unit length,
  the focal length of a first output image has a predetermined focal length value, and
the focal length of each other output image is shorter than that of a previous output image,
wherein the creation of the output images, except for the first output image, comprises
  downsampling the previous output image by a factor of the focal length of the previous output image divided by the focal length of a current output image, and
  assigning a downsampled result to a corresponding area of the current output image, and
wherein the creation of the output images comprises, for areas to which no downsampled results have been assigned,
  computing unnormalized coordinates corresponding to coordinates of the output image,
  computing a projection of the unnormalized coordinates onto the raw image via a lens function, and
  obtaining color values for the pixels of the output image at the coordinates of the output image from the pixels at the projected unnormalized coordinates of the raw image.

22. The vehicle according to claim 21, wherein creating the set of N output images comprises, for remaining areas to which no downsampled results have been assigned, converting each remaining area of the raw image to a gnomonic projection representation of the panorama such that the converted remaining areas and the downsampled results form the output images other than the first output image.

23. The vehicle according to claim 21, wherein in creating the set of N output images, each area of a plurality of areas of the raw image is converted to the gnomonic projection representation of the panorama only one time, with a first area of the plurality of areas being converted when creating the first output image, and a second area of the plurality of areas being converted when creating a second output image.

* * * * *